(12) United States Patent
Steinsiek et al.

(10) Patent No.: US 11,726,225 B2
(45) Date of Patent: Aug. 15, 2023

(54) DETECTION AND EVALUATION OF ULTRASONIC SUBSURFACE BACKSCATTER

(71) Applicants: Roger Steinsiek, Houston, TX (US); Hermanus J. Nieuwoudt, Tomball, TX (US); Brian A. Moody, New Iberia, LA (US); Andal Pierre, Woodlands, TX (US)

(72) Inventors: Roger Steinsiek, Houston, TX (US); Hermanus J. Nieuwoudt, Tomball, TX (US); Brian A. Moody, New Iberia, LA (US); Andal Pierre, Woodlands, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 159 days.

(21) Appl. No.: 17/088,321

(22) Filed: Nov. 3, 2020

(65) Prior Publication Data

US 2021/0140305 A1 May 13, 2021

Related U.S. Application Data

(60) Provisional application No. 62/932,215, filed on Nov. 7, 2019.

(51) Int. Cl.
*G01V 1/50* (2006.01)
*E21B 47/095* (2012.01)
(Continued)

(52) U.S. Cl.
CPC ............ *G01V 1/50* (2013.01); *E21B 47/0025* (2020.05); *E21B 47/095* (2020.05); *E21B 49/00* (2013.01);
(Continued)

(58) Field of Classification Search
CPC .......... G01V 1/50; G01V 1/001; G01V 1/306; G01V 2210/43; G01V 2210/6244;
(Continued)

(56) References Cited

U.S. PATENT DOCUMENTS 4,168,483 A * 9/1979 Parthasarathy .......... G01V 1/44
181/102
4,283,953 A * 8/1981 Plona ..................... G01N 29/11
73/599

(Continued)

FOREIGN PATENT DOCUMENTS

CA 2727372 A1 * 12/2009 ............... G01V 1/46

OTHER PUBLICATIONS

Blyth et al.; Revealing hidden information—high resolution LWD slowness measurement and imaging using advanced dual ultrasonic technology; SPWLA-5077; abstract; 1 page.

(Continued)

*Primary Examiner* — Ian J Lobo
(74) *Attorney, Agent, or Firm* — Cantor Colburn LLP (57) ABSTRACT

A system for estimating a property of a region of interest includes an acoustic measurement device including a transmitter configured to emit an acoustic signal having at least one selected frequency configured to penetrate a surface of a borehole in an earth formation and produce internal diffuse backscatter from earth formation material behind the surface and within the region of interest, and a receiver configured to detect return signals from the region of interest and generate return signal data. The system also includes a processing device configured to receive the return signal data, process the return signal data to identify internal diffuse backscatter data indicative of the internal diffuse backscatter, calculate one or more characteristics of the internal diffuse backscatter, and estimate a property of the (Continued)

region of interest based on the one or more characteristics of the internal diffuse backscatter.

12 Claims, 7 Drawing Sheets

(51) Int. Cl.
*G01V 1/00* (2006.01)
*E21B 47/002* (2012.01)
*G01V 1/30* (2006.01)
*E21B 49/00* (2006.01)

(52) U.S. Cl.
CPC .............. *G01V 1/001* (2013.01); *G01V 1/306* (2013.01); *G01V 2210/43* (2013.01); *G01V 2210/624* (2013.01); *G01V 2210/6244* (2013.01); *G01V 2210/6246* (2013.01)

(58) Field of Classification Search
CPC .............. G01V 2210/6246; G01V 1/48; E21B 47/0025; E21B 47/095; E21B 49/00
See application file for complete search history.

(56) References Cited

U.S. PATENT DOCUMENTS

| | | |
|---|---|---|
| 9,766,363 B2 | 9/2017 | Morys |
| 2010/0258304 A1 | 10/2010 | Hegeman |
| 2014/0056101 A1 | 2/2014 | Vu et al. |
| 2016/0209543 A1 | 7/2016 | Valero et al. |

OTHER PUBLICATIONS

Bond et al., Evaluation of Non-Nuclear Techniques for Well Logging, PNNL-20831, Aug. 2011; 38 total pages.

Denslow et al.; 2010; Evaluation of Non-Nuclear Techniques for Well Logging: Acoustic Diffuse Field Measurements. PNNL-19850, Pacific Northwest National Laboratory; Richland, Washington.

International Preliminary Report on Patentability for International Application No. PCT/US2020/059039; dated May 10, 2022; 5 pages.

* cited by examiner

DETECTION AND EVALUATION OF ULTRASONIC SUBSURFACE BACKSCATTER

CROSS REFERENCE TO RELATED APPLICATIONS

This application claims the benefit of an earlier filing date from U.S. Provisional Application Ser. No. 62/932,215 filed Nov. 7, 2019, the entire disclosure of which is incorporated herein by reference.

BACKGROUND

Acoustic imaging includes a variety of techniques that are used in the energy industry to measure or estimate characteristics of earth formations. Such techniques include borehole sonic and ultrasonic imaging of borehole surfaces. For example, ultrasonic imaging tools can be deployed in a borehole and used to obtain information regarding formation characteristics such as lithology and fracture configurations based on acoustic images of surfaces of a borehole.

SUMMARY

An embodiment of a system for estimating a property of a region of interest includes an acoustic measurement device configured to be disposed in a region of interest in an earth formation, the acoustic measurement device including a transmitter configured to emit an acoustic signal having at least one selected frequency configured to penetrate a surface of a borehole and produce internal diffuse backscatter from earth formation material behind the surface and within the region of interest, and a receiver configured to detect return signals from the region of interest and generate return signal data. The system also includes a processing device configured to receive the return signal data, process the return signal data to identify internal diffuse backscatter data indicative of the internal diffuse backscatter, calculate one or more characteristics of the internal diffuse backscatter, and estimate a property of the region of interest based on the one or more characteristics of the internal diffuse backscatter.

An embodiment of a method of estimating a property of a region of interest includes deploying an acoustic measurement device in a borehole within the region of interest in an earth formation, the acoustic measurement device including a transmitter and a receiver. The method also includes emitting, by the transmitter, an acoustic signal having at least one selected frequency configured to penetrate a surface of the borehole and produce internal diffuse backscatter from earth formation material behind the surface and within the region of interest, and detecting, by the receiver, return signals from the region of interest and generating return signal data. The method further includes processing the return signal data by a processing device to identify internal diffuse backscatter data indicative of the internal diffuse backscatter, calculating one or more characteristics of the internal diffuse backscatter, estimating a property of the region of interest based on the one or more characteristics of the internal diffuse backscatter, and controlling an operational parameter of an energy industry operation based on the estimated property.

BRIEF DESCRIPTION OF THE DRAWINGS

The following descriptions should not be considered limiting in any way. With reference to the accompanying drawings, like elements are numbered alike.

DETAILED DESCRIPTION

Systems, methods and apparatuses are provided herein for acoustic evaluation of properties of a resource bearing formation or formation region. An embodiment of a system for evaluating a region of interest includes at least one transmitter device configured to emit acoustic signals (acoustic measurement signals) having ultrasonic frequencies configured to penetrate the surface of a borehole wall into an internal structure of the region of interest behind and/or around a borehole. Acoustic return signals are produced by interactions with the environment around the transmitter device.

In one embodiment, the system includes at least one receiver device that is configured to detect acoustic return signals, generate return signal data and process the return signal data to identify internal diffuse backscatter data indicative of acoustic internal diffuse backscatter from internal structural features of the region of interest (referred to as "internal diffuse backscatter"). The internal diffuse backscatter is used to estimate a structural property of the region of interest based on one or more characteristics of the internal diffuse backscatter.

Figure 1:
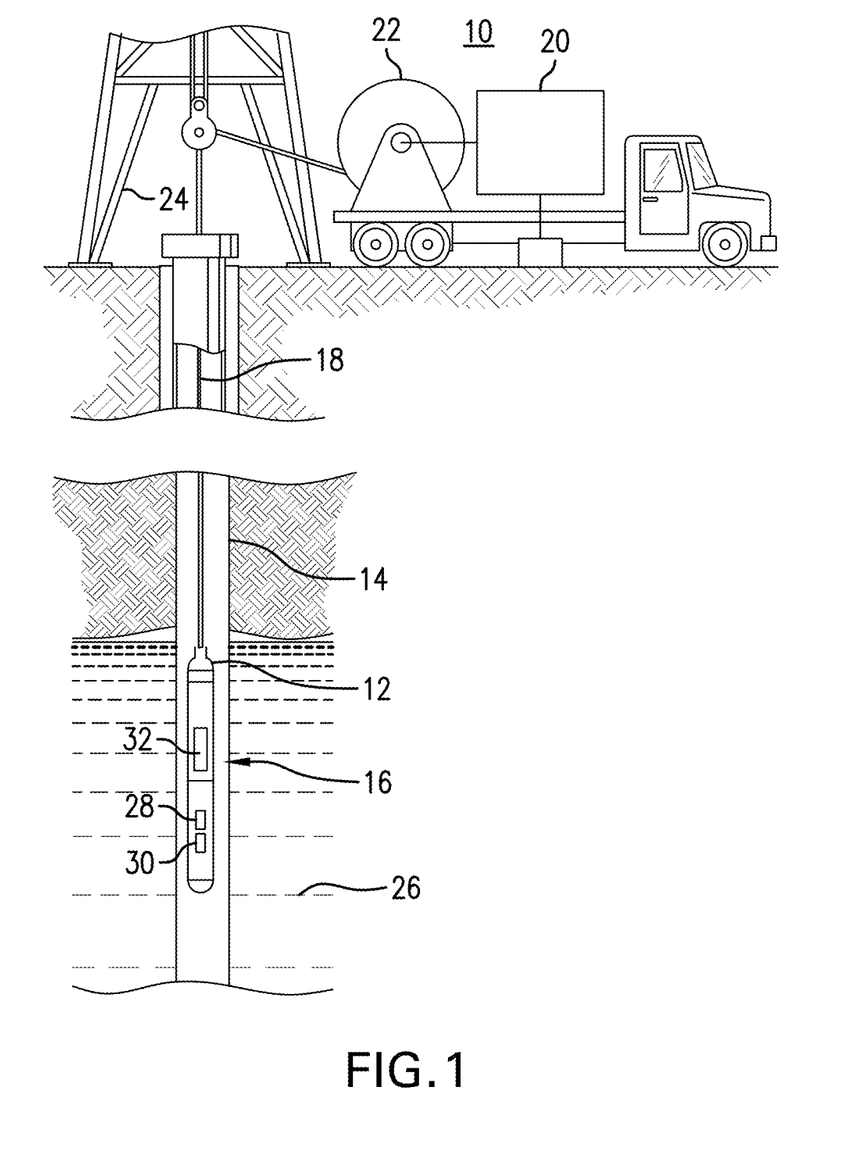
FIG. 1 depicts an embodiment of a system for evaluating or measuring a formation.

FIG. 1 illustrates aspects of an exemplary embodiment of a system 10 for performing energy industry operations (e.g., subterranean operations and/or surveys) such as formation measurement and/or evaluation, hydrocarbon production, completion and stimulation. The system 10 includes a borehole string 12 such as a pipe string, coiled tubing, wireline or other carrier disposed within a borehole 14 that is suitable for lowering a tool or other component through a borehole or connecting a component to the surface. The borehole 14 may be a vertical borehole as shown in FIG. 1, but is not so limited. The borehole or portions thereof can be vertical, deviated, horizontal and can have any selected path through a formation.

In the embodiment of FIG. 1, the system 10 is configured as a well logging system that includes a logging assembly or logging tool 16 that is disposed in the borehole 14 via a wireline 18. It is noted that the logging tool 16 is not so limited, as the logging tool 16 may be configured for and deployed as part of any other type of system, such as a measurement while drilling (MWD) or logging while drilling (LWD) system in a drill string.

A surface deployment system includes a surface control unit 20 for controlling a winch 22 or other deployment device that lowers the wireline 18 from a rig 24, platform, wellhead and/or other surface structure. The system 10 may include various other components for facilitating a measurement operation, and/or for facilitating other energy operations. For example, the system 10 may include a pumping device in fluid communication with a fluid tank or other fluid source for circulating fluid through the borehole 14. The system 10 may also include a drilling assembly including a drill string, a bottom hole assembly and a drill bit. The bottom hole assembly may include a formation evaluation sensor (FE tool), a rotary steerable system, a mud motor, and a/or communication device (e.g., a mud pulser). The formation evaluation sensor may include an acoustic sensor, a resistivity sensor, a gamma sensor, a NMR sensor, a sampling tool, a pressure sensor, a density sensor (nuclear), and/or other sensor or measurement device. Measurement operations can thus be performed in conjunction with various energy industry operations, such as drilling operations, stimulation operations (e.g., hydraulic fracturing and steam lift), completion operations and production operations.

The logging tool 16 may be configured as a data acquisition tool that is a part of an acoustic measurement and/or monitoring system. The logging tool 16 may comprise a memory used to store acquired data inside the logging tool 16 while the logging tool 16 is inside the borehole 14. In alternative embodiments, the acquired data is stored in a memory at a surface location, e.g. inside the surface control unit 20. The logging tool 16 is disposed in the borehole 14 and advanced to a selected location corresponding to a region of interest, which includes at least part of an earth formation 26. The earth formation 26 may be a resource bearing formation. The logging tool 16 is configured to emit acoustic measurement signals into the region of interest and formation 26 to estimate characteristics thereof.

The logging tool 16 includes an acoustic measurement assembly having one or more acoustic monopole and/or multipole transmitter or transceiver devices 28 that emit ultrasonic and/or other acoustic signals as energy pulses (also referred to as "measurement signals" or "acoustic signals"). One or more acoustic receiver or transceiver devices 30 are disposed at the tool 16 for receiving return signals (also referred to as echoes) produced due to reflections and other interactions between the acoustic measurement signals and the environment surrounding the transmitter device(s) 28. The receiver device(s) 30 and the transmitter device(s) 28 may be configured in any suitable manner that allows ultrasonic measurements of the region of interest. For example, the acoustic measurement assembly may include a rotating acoustic transducer or a phased array transducer that electronically rotates an ultrasonic acoustic beam. Rotating refers to rotating around a longitudinal axis of the tool 16 or rotating around a longitudinal axis of the borehole 14.

The receiver device(s) 30 and the transmitter device(s) may be configured as pulse-echo transducers and/or pitch-catch transducers. When operating in pulse-echo mode, one transducer is used and acts as both a transmitter and receiver (transceiver). When operating in pitch-catch mode, one transducer is configured as a transmitter and emits acoustic measurement signals as acoustic pulses (e.g. ultrasonic pulses), while another transducer behaves as a receiver and collects return signals generated due to reflections of the acoustic pulses. The receiver may include a piezoelectric receiver using a piezoelectric crystal. The transmitter may include a piezoelectric transmitter using a piezoelectric crystal.

The acoustic measurement assembly can have various arrangements and numbers of transmitters and receivers. For example, an arrangement can include one or more transmitters that emit multiple frequencies, and/or include multiple numbers of transducers arrayed along the logging tool 16 to detect backscatter.

The logging tool 16 and/or other downhole components are in communication with one or more processing units or devices, such as a downhole electronics unit 32, including a processor, and/or a surface processor such as the surface control unit 20. The processing device (or devices) is configured to perform various functions including receiving, storing, transmitting and/or processing data from the tool 16. The processing device includes any number of suitable components, such as a processor, memory, communication devices and power sources. Communication can be achieved via any suitable configuration, such as acoustic, electrical or optical communication, wireless communication and mud pulse telemetry. For example, communication is performed between devices included in the tool 16, between different tools in a bottom hole assembly in a drill string, or between the tool 16 and a surface control unit.

In a drilling operation, in one embodiment, the drill string can be rotated by driving the drill string by a top drive or rotary table. The drill string transfers the rotation to the drill bit that cuts formation material (e.g., rock) and propagates into the earth formation with a rate of penetration. The tool 16 rotates with the rotating drill string and passes along the earth formation with the rate of penetration while performing acoustic measurements at increasing depth (decreasing depth while tripping out of hole). The acoustic signals are transmitted into the surrounding earth formation by the transmitter and the acoustic return signals are received by the receiver from the borehole surface and the region of interest inside the earth formation surrounding the borehole. The acquired logging data are commonly time based as the depth is commonly not known downhole. The acquired logging data may be processed by the processor in the tool 16 while in the borehole. In alternative embodiments, the acquired data is transmitted to the surface by using mud pulse telemetry or alternative communication means (e.g., wired pipe), providing real time data. Once received at the surface, the acquired data can be further processed by the surface processor and a depth assigned. Advanced technology may allow depth assignment downhole (downhole depth). Having depth based data available downhole provides for automatic drilling control without drilling control information telemetered from surface to the bottom hole assembly in the borehole (downlink). With automated drilling control, downhole automated geo-steering for optimum well placement becomes feasible.

In one embodiment, the system 10 is configured to image or otherwise estimate properties of structural features of the region of interest away from and behind a surface of the borehole 14. Such features are referred to herein as "internal structural features." Internal structural features can be distinguished from other features in a volume surrounding the logging tool 16, such as features of borehole fluid, features of components disposed in the borehole 14, fluid properties of a formation and features of a borehole surface (e.g., a wall of an open borehole or a casing) features. The logging tool 16 is configured to estimate internal structural features based on internal diffuse backscatter from acoustic signals (e.g. ultrasonic signals) within the region of interest away from and behind the surface of the borehole 14 (internal diffuse backscatter). The term "away from and behind a surface of the borehole" refers to acoustic signals from a location or region corresponding to a depth of investigation (DOI) into the earth formation surrounding the borehole 14. A typical DOI may range from about a few centimeters up to about a meter. In some embodiments, the DOI may be about 1 cm to about 10 cm. In other embodiments, the DOI may be about 1 cm to about 5 cm. In yet other embodiments, the DOI may be about 1 cm to about 3 cm. The DOI is measured in a direction perpendicular to the longitudinal axis of the tool 16, or alternatively, in a direction perpendicular the longitudinal axis of the borehole 14.

As noted above, in one embodiment, the system 10 is configured to image or estimate internal structural features of a region of interest using ultrasonic or ultrasound frequencies. Ultrasonic frequencies may be classified as frequencies above about 20 kHz. In contrast to sonic frequencies below 20 kHz, ultrasonic frequencies permit the detection and evaluation of relatively small structural features (e.g., the microstructure). Small structural features may refer to features in the centimeter range. In some embodiments, small structural features may refer to features in the millimeter range. In yet other embodiments, small features may refer to features in the micrometer range.

For example, at sonic frequencies below 20 kHz and wavelengths greater than 175 mm, the granular structure of the rock in a formation effectively presents a continuous homogeneous wave media where the dominant source of coherent wave attenuation is dissipative. Sonic instruments using such frequencies measure sonic wave speed, attenuation, and allowed acoustic modes to characterize the formation with about 1000 mm resolution, but leave the microstructural features of the rock unresolved. The term "rock" as used herein refers to rock material in an earth formation material.

In contrast, the transmitter device 28 is configured to emit acoustic signals at ultrasonic frequencies that generate internal diffuse backscatter. The ultrasonic frequencies are selected to have a favorable value for the parameter kd, which is the product of the wavenumber k of an acoustic signal and particle diameter d (e.g. grain size or pore size in an earth formation material). The frequency, in one embodiment, is selected based on particle size characteristics of a formation so that kd is less than about 2.

For example, the transmitter device 28 is configured to emit acoustic signals having properties that include ultrasonic frequencies greater than about 500 kHz, have one or more wavelengths on the order of about 7 mm, and have kd values of about 0.2250. In this example, the ultrasonic wave field (acoustic signal) interacts with the rock's granular microstructure such that the wave attenuation (acoustic signal attenuation) is augmented by diffuse scattering. This permits the characterization of the rock microstructure by measuring the diffuse ultrasonic wave field characteristics from within the rock. In one embodiment, the transmitter device 28 is configured to emit acoustic signals having frequencies between about 250 kHz to about 1 MHz, which has been found to be practical for tools operating in highly attenuative drilling fluids.

The logging tool 16, in addition to emitting ultrasonic acoustic signals having the above characteristics, is configured to detect acoustic return signals and process the acoustic return signals to identify or isolate and evaluate constituents of the return signals that represent internal diffuse backscatter. As discussed further below, the internal diffuse backscatter is one of many constituents of an acoustic return signal.

In addition to internal diffuse backscatter, return signals also include reflected signals (echoes) from the surface of the borehole 14, which include surface specular echoes and diffuse surface echoes. Existing pulse-echo wireline and LWD ultrasonic open hole imaging instruments can investigate the surface of the borehole 14 by capturing such surface reflection signals and recording their amplitude and travel time.

Figure 2A:
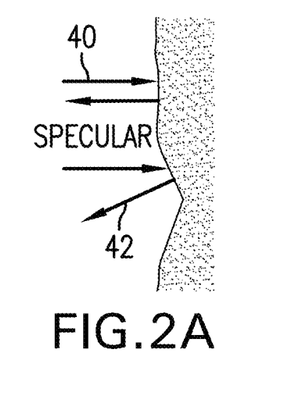
FIGS. 2A and 2B depict aspects of surface echoes of acoustic signals.
Figure 2B:
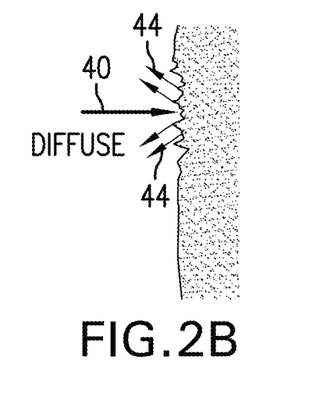

FIGS. 2A and 2B illustrate aspects of specular and diffuse surface echoes, respectively, that result from acoustic measurement signals 40. As shown, surface specular echoes 42 originate from relatively large and/or regularly shaped surface features with smooth surfaces. These echoes are relatively intense and angle dependent. Diffuse surface echoes 44 originate from relatively small, weakly reflective and/or irregularly shaped features, and are less angle dependent and less intense. Specular surface echoes are also referred to as specular surface reflections. Diffuse surface echoes are also referred to as diffuse surface reflections.

The specular surface reflection is a function of the contrast between borehole fluid and formation acoustic impedances, while the diffuse surface reflection is dominated by borehole surface texture. The resulting amplitude image can be indicative of bedding planes and fractures that traverse a borehole and the surface rugosity of a borehole.

Figure 3:
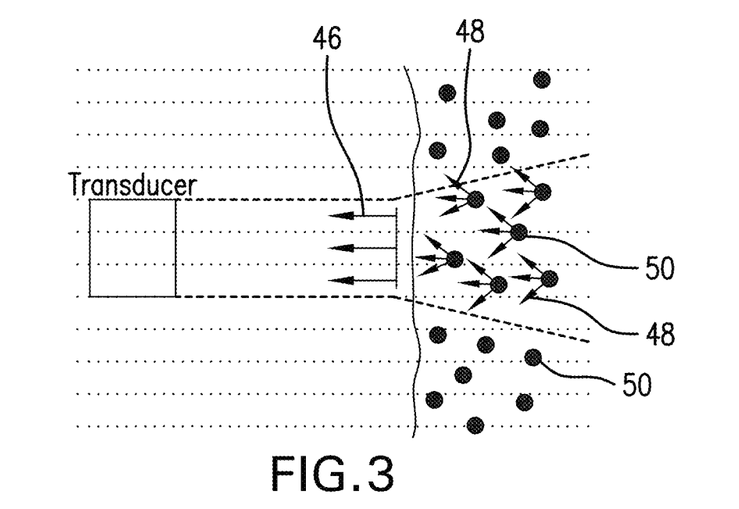
FIG. 3 depicts aspects of internal diffuse backscatter from a region of interest of an earth formation.

The receiver device 30, which includes a detector and a processing device (which can be incorporated within the receiver device 30 with the detector or disposed remote from the detector), is configured to process return signal data to separate or isolate data indicative of surface echoes from data indicative of internal diffuse backscatter. An example of internal diffuse backscatter is shown in FIG. 3. In this example, a return signal 46 produced according to embodiments described herein includes internal diffuse backscatter 48 that originate within the body of the formation region, due to reflections caused by grains, pores and other microstructures 50. The term internal diffuse backscatter is also referred to as internal diffuse echoes or internal diffuse reflections. The detector includes a sensor. The sensor may include a piezoelectric crystal.

The return signal 46 can be gated and/or otherwise processed to isolate constituents that are representative of internal diffuse backscatter. In one embodiment, the return signal 46 is gated by selecting a specific length of time associated with internal diffuse backscatter. The gating is controlled by the processing device.

Figure 4:
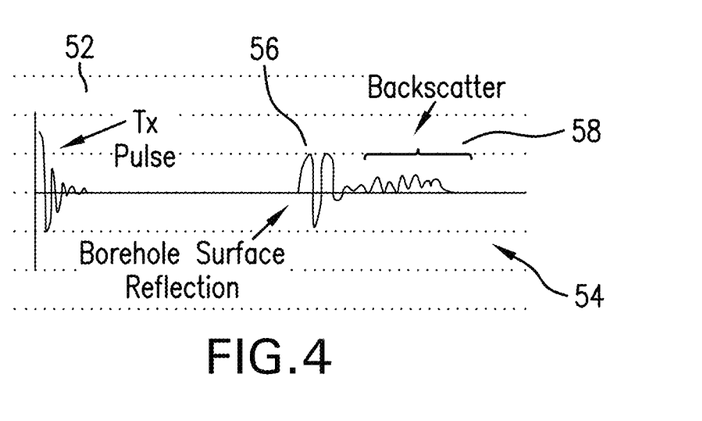
FIG. 4 depicts an example of an acoustic return signal produced by reflections of an acoustic measurement signal from a region of interest of an earth formation.

This is illustrated by FIG. 4, which shows an example of an acoustic measurement signal that includes an ultrasonic time domain (Tx) signal pulse 52, which results in a backscatter signal or acoustic return signal 54 after interacting with the earth formation volume surrounding the logging tool. The measurement signal may have a single frequency or multiple frequencies. The return signal 54 is shown as a time-domain waveform having a first portion 56 that is primarily due to surface reflections, and a second portion 58 that is primarily due to internal diffuse reflections. By properly gating the waveform (i.e., isolating a selected length of the time axis), the second portion 58 of the waveform indicative of internal diffuse backscatter (subsurface reflections) can be identified. This portion can then be evaluated to estimate one or more structural features of the region of interest.

Figure 5A:
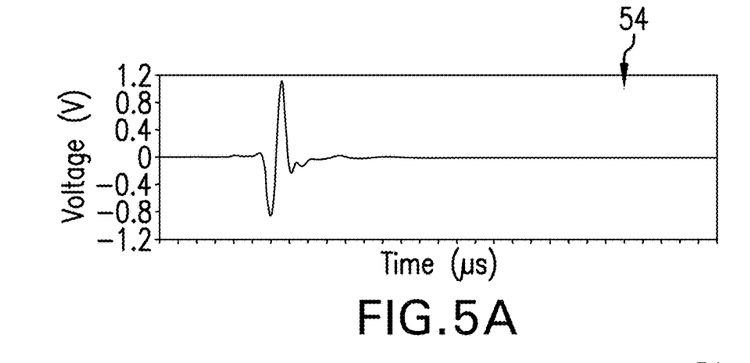
FIGS. 5A-5D depict examples of acoustic return signals and portions of the acoustic return signals associated with internal diffuse backscatter from a region of interest of an earth formation.

FIGS. 5A-5D show examples of the acoustic return signal 54 produced by emitting a single ultrasonic pulse toward earth formation materials having different microstructures. In FIG. 5A, the acoustic return signal 54 was taken from a thick zero porosity reflector. The signal 54 only includes surface reflections and is thus dominated by a return pulse with little or no subsequent wave energy.

Figure 5B:
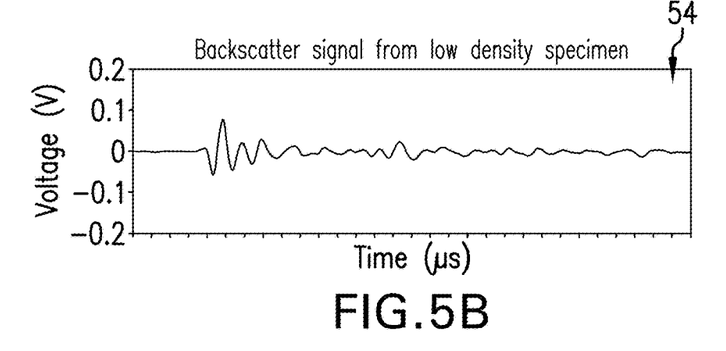
Figure 5C:
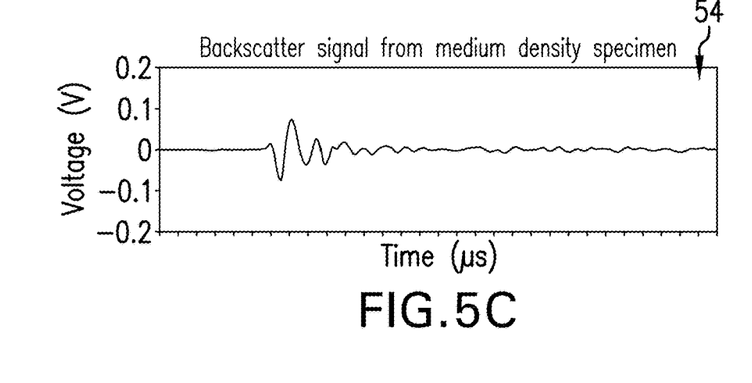
Figure 5D:
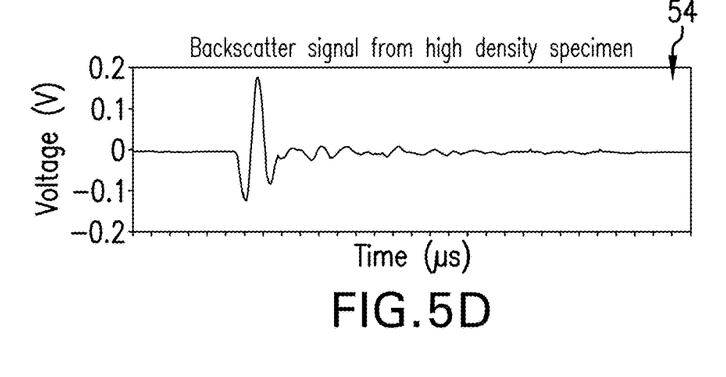

FIG. 5B shows the return signal 54 from a low density material. In this example, the signal includes a high energy initial portion that includes initial pulses corresponding to surface reflections and a distinct tail portion corresponding to internal diffuse backscatter from internal structural features in the region of interest. FIGS. 5C and 5D show the return signal 54 from a medium density material and a high density material, respectively.

As shown above, by isolating (gating) and analyzing the tail portion of an ultrasonic acoustic return signal as discussed herein, internal structural features of a earth formation material, such as density and porosity, can be estimated.

Identifying and analyzing the internal diffuse backscatter can be performed in a variety of ways. Techniques that isolate and characterize internal diffuse backscatter are described as follows. Each technique includes processing return signals to estimate a characteristic or property of internal diffuse backscatter that is then correlated to one or more internal structural features of a region of interest, such as density, porosity, and/or brittleness.

Figure 6:
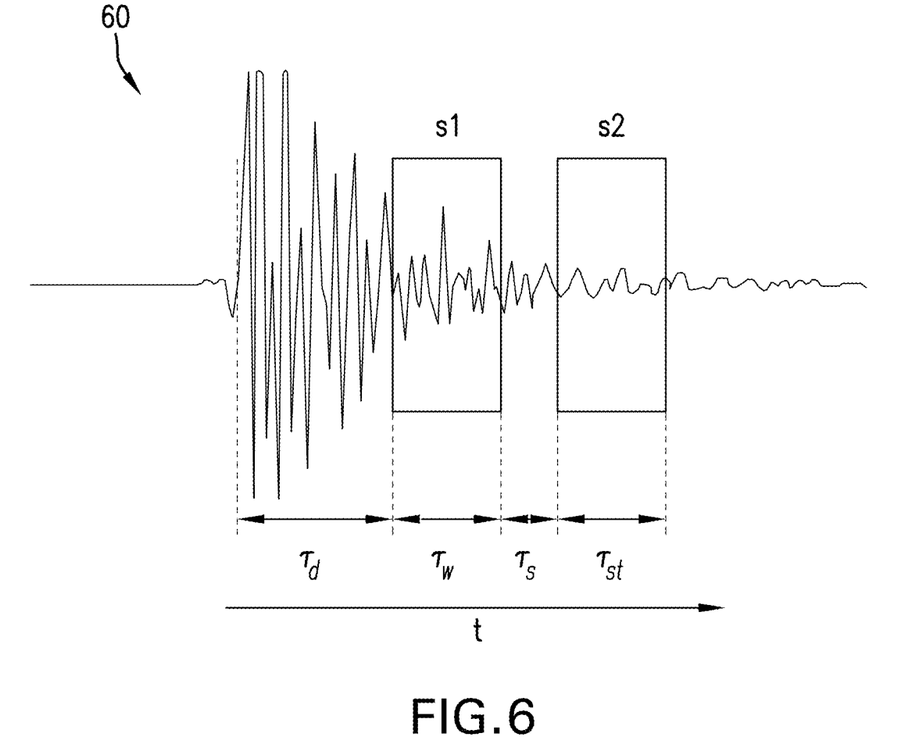
FIG. 6 depicts examples of gated portions of an acoustic return signal.

Referring to FIG. 6, in one embodiment, the system gates and analyzes acoustic return signals to estimate attenuation characteristics of the acoustic return signal. In this embodiment, multiple segments or portions of a tail portion of a time domain return signal are selected and compared to estimate attenuation. For example, a time domain return signal 60 is gated by selecting two portions that follow an initial portion having high energy return pulses. The two portions are denoted as a first time domain return signal segment s1 and a second time domain return signal segment s2. The gate intervals are indicated by $\tau_W$ for s1 and $\tau_{st}$ for s2. These portions are compared in different ways as discussed further below to estimate attenuation characteristics of the acoustic return signal, which can then be used to estimate one or more structural properties of a region of interest. The time interval $\tau_d$ shown in FIG. 6 includes the strong signal of the transducer response, which is characteristic of a particular transducer (alternatively a particular transmitter). Isolating the transducer response from the tail portion (s1 and s2) of the acoustic return signal is required to extract the information of the internal structural features from the acoustic return signal in the processing step. Isolation is achieved by processing only the return signals in the time intervals $\tau_W$ and $\tau_{st}$ with a time interval $\tau_S$ between $\tau_W$ and $\tau_{st}$. The time interval $\tau_d$ can be achieved by a reference measurement using a perfect or near-perfect homogeneous reflector (e.g. glass or steel).

In one embodiment, the receiver device 30 estimates an attenuation value by performing a spectral difference attenuation analysis. The result of the analysis is an attenuation coefficient $\alpha$, which can be correlated or associated with formation structural properties.

This analysis includes selecting two segments of an acoustic return signal associated with different spatial distances from a borehole surface in the region of interest. For example, once time based return signal of segments s1 and s2 are selected, a power spectrum as a function of frequency (f) is calculated for each segment s1 and s2 using a Fourier transform. The power spectrum for segment s1 is denoted $P_1(f)$, and the power spectrum for segment s2 is $P_2(f)$. An attenuation coefficient function $\alpha(f)$ is estimated based on the following equation:

$$\alpha(f) = \frac{P_1(f) - P_2(f)}{\Delta z}, \qquad (1)$$

where $\Delta z$ is a difference between the distance (along the direction of the ultrasonic signal or longitudinal direction) from a transmitter to the first return signal segment s1 and the distance from the transmitter to the second return signal segment s2. The attenuation coefficient $\alpha$ is calculated as the slope of the best fit straight line for the coefficient function $\alpha(f)$. The distance z has the unit meters (m) and is defined as a traveled distance of the acoustic signal within a time interval. $\Delta z$ is the difference between the distance from the transmitter to the first return signal segment s1 and the distance from the transmitter to the second segment s2. $\Delta z$ can be calculated by the time difference between the first return signal segment s1 and the second return signal segment s2 multiplied by the speed of sound. The time difference is defined by the difference in time between a representative time within the length of time $\tau_W$ associated with the first return signal segment s1 and a representative time within the length of time $\tau_{st}$ associated with the second return signal segment s2. In accordance with embodiments of the present disclosure, without limitation, the representative time within the length of time associated with the first and second return signal segments may be the center time of the selected length of time ($\tau_W$ and $\tau_{st}$) of the gated return signal. Other definitions of the representative time are possible and do not change equation (1).

Figure 7:
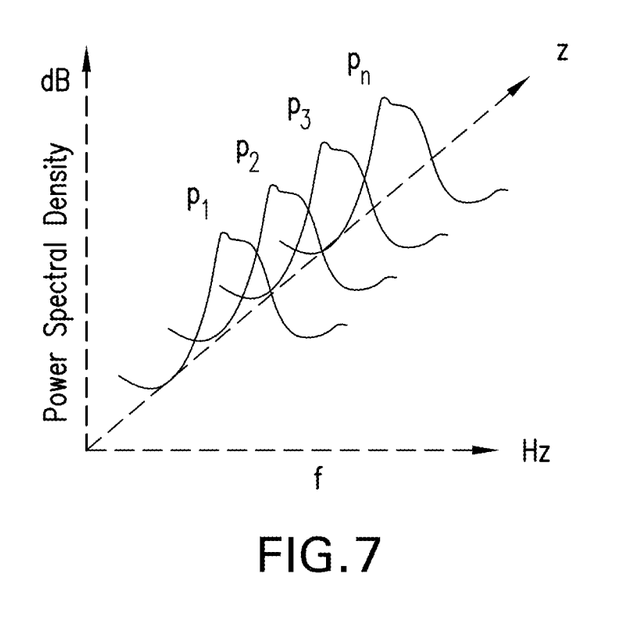
FIG. 7 depicts an example of power spectra calculated based on the gated portions of FIG. 6.

Examples of power spectra at different distances z that can be calculated from the return signal 60 are shown in FIG. 7. As shown, any number n of return signal segments (s1, s2, s3, sn) and associated power spectra ($P_1$, $P_2$, $P_3$, $P_n$) can be used to calculate the attenuation coefficient. In some embodiments, instead of using a power spectrum, a log power spectrum may be used. The power spectrum or log power spectrum may also be referred to as a frequency spectrum. All equations disclosed in here are true using a power spectrum or a log power spectrum.

In one embodiment, the receiver device 30 estimates the attenuation of the acoustic return signals by estimating the spectral centroid shift and/or apparent spectral centroid shift of the power spectra. In this embodiment, the receiver device 30 estimates the spectral centroid, which is calculated in an analogous manner as center of energy or center of mass calculations. The spectral centroid is calculated as a spectral centroid frequency ($f_c$) corresponding to the weighted mean of each frequency (fi) in a return signal segment (si) of the signal 60. For example, the spectral centroid frequency ($f_c$) is calculated as follows:

$$fc = \frac{\sum_{i=f_i}^{i_2} f_i P(f_i) \Delta f}{\sum_{i=f_i}^{i_2} P(f_i) \Delta f}, \qquad (2)$$

where fi is the center frequency between frequencies $i_1$ and $i_2$, P(fi) is the power spectrum at a given frequency fi, and $\Delta f$ is the difference between the lowest frequency and the highest frequency.

To obtain the attenuation shift ($\alpha$), the spectral centroid frequency for a first segment ($f_{c1}$) is subtracted from the spectral centroid frequency for the second segment ($f_{c2}$). For example, the apparent spectral centroid shift attenuation is calculated as:

$$\alpha = \frac{f_{c1} - f_{c2}}{\sigma^2 \Delta z}, \quad (3)$$

where $\sigma^2$ is the spectral bandwidth (variance) of the transducer that is used to make the measurement of return signals. In some embodiments, $\sigma^2$ is the spectral bandwidth of the receiver or the spectral bandwidth of the transmitter.

Alternatively, the spectral centroid shift attenuation can be calculated similarly to the apparent spectral centroid shift attenuation, except $f_{c1}$ is taken from a segment or window corresponding to surface specular echoes.

In one embodiment, the receiver device 30 is configured to estimate internal diffuse backscatter difference parameters for use in estimating structural properties of a region of interest. In this embodiment, power spectra are obtained from two different gated portions of the signal (e.g., s1 and s2). The power spectra (in dB) are subtracted to obtain an internal diffuse backscatter difference spectrum D(f).

A statistical attribute of the difference spectrum can be calculated to estimate a structural property. For example, the mean of the internal diffuse backscatter difference spectrum (MBD) is obtained by frequency averaging D(f) over the analysis bandwidth. The slope of the internal diffuse backscatter difference spectrum (SBD) is obtained by measuring the frequency slope of DO over the same bandwidth. Power spectra $P_1(f)$ and $P_2(f)$ from the first and second gated portions of the internal diffuse backscatter signal (return signal segments) are converted to decibels and subtracted to obtain the difference spectrum D(f):

$$D(f) = 10\log_{10} P_1(f) - 10\log_{10} P_2(f) = 10\log\left(\frac{P_1(f)}{P_2(f)}\right). \quad (4)$$

In one embodiment, entropy characteristics of the signals are analyzed to estimate structural properties. Entropy is useful for analyzing raw radio frequency (RF) ultrasound signals to quantitatively characterize the changes in the microstructure of scattering media. Such characteristics include, e.g., weighted entropy and spectral entropy. In acoustic logging the term RF signal or RF waveform refers to a time domain signal or a time domain waveform before any type of filters are applied to the time domain signal or waveform (envelope filter, Kalman filter, etc.).

In one embodiment, in order to increase the sensitivity of the receiver device 30, a weighted entropy can be estimated. The weighted entropy can be expressed as:

$$\hat{H}_c = -\int_{y_{min}}^{y_{max}} yw(y)\log_2[w(y)]dy, \quad (5)$$

where y is the amplitude of time series data, w(y) is the probability distribution function (PDF) of the time series data (the raw ultrasonic RF data), and $y_{min}$ and $y_{max}$ represent the minimum and maximum values of the time series data. The PDF can be expressed as $$w(y) = \sum_{n=-N_{co}}^{N_{co}} a_n e^{i\pi n y}, \quad (6)$$

where $a_n$ is the series of the Fourier coefficients, and $N_{co}$ represent a finite number of terms in the series. Weighting refers to selecting an amplitude resolution $\Delta y$ and $N_{co}$ for optimal sensitivity for detecting variation to ultrasound scattering concentrations. For example, for $N_{co}$=[0, 2, 4, 8, 16, 32, 64, 128] and $\Delta y$=[0.01, 0.02, 0.04, . . . 0.25], selecting $\Delta y$ of the normalized RF amplitude to be 0.02, and Nco to be 64.

In one embodiment, the receiver device calculates the spectral entropy (S) of a return signal. A power spectrum is calculated for the return signal, and is normalized to compute a normalized power spectrum $P_n$(fi). The normalized power spectrum is computed by setting a normalization constant $C_n$ so that the sum of the normalized power spectrum over a selected frequency region $[f_1, f_2]$ is equal to one:

$$\sum_{f_i=f_1}^{f_2} P_n(f_i) = C_n \sum_{f_i=f_1}^{f_2} P(f_i) = 1. \quad (7)$$

The spectral entropy S corresponding to the frequency range $[f_1, f_2]$ is computed as a sum:

$$S[f_1, f_2] = \sum_{f_i=f_1}^{f_2} P_n(f_i)\log\left(\frac{1}{|P_n(f_i)|}\right). \quad (8)$$

The entropy value S is normalized to range between 1 (maximum irregularity) and 0 (complete regularity). This value is divided by the factor log ($N[f_1, f_2]$) where $N[f_1, f_2]$ is equal to the total number of frequency components in the range $[f_1, f_2]$:

$$S_N[f_1, f_2] = \frac{S[f_1, f_2]}{\log(N[f_1, f_2])}. \quad (9)$$

The normalized spectral entropy SN can be expressed in various ways. For example, the normalized spectral entropy SN can be the total spectral entropy (entropy of the entire return signal), internal diffuse backscatter spectral entropy (entropy of entire internal diffuse backscatter signal), and/or internal diffuse backscatter difference entropy (the difference between entropy calculated for different gated portions of the return signal).

Figure 8:
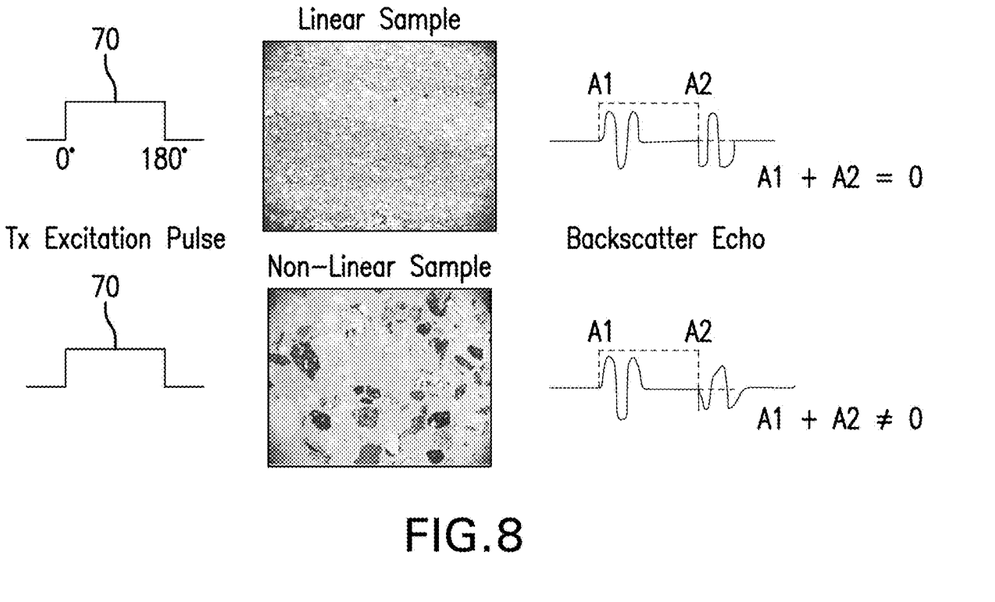
FIG. 8 depicts aspects of transmitting acoustic measurement signals and processing acoustic return signals to estimate a degree of nonlinearity of a region of interest of an earth formation.
Figure 9:
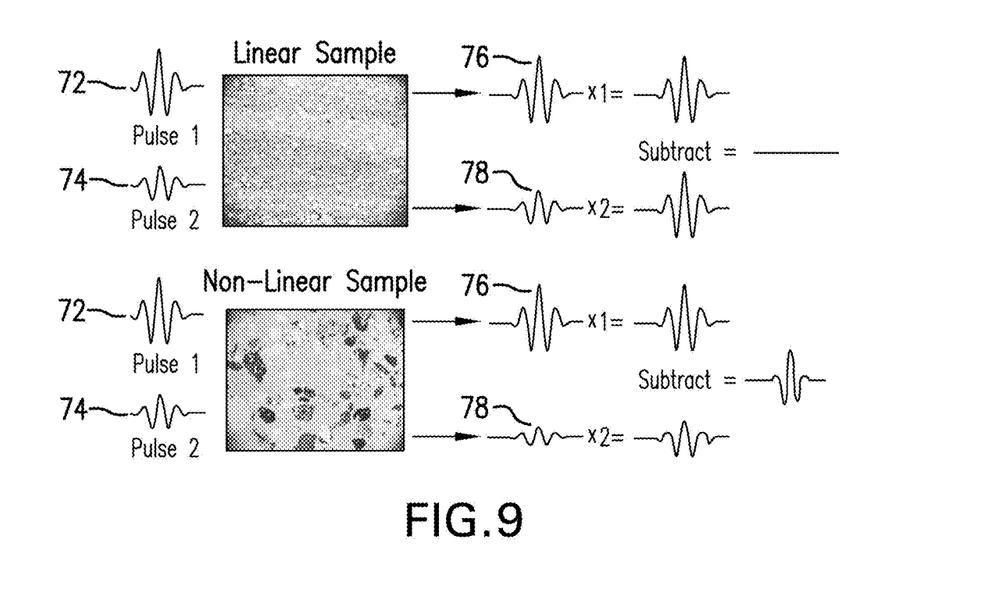
FIG. 9 depicts aspects of transmitting acoustic measurement signals and processing acoustic return signals to estimate a degree of nonlinearity of a region of interest of an earth formation.

FIGS. 8 and 9 illustrate additional examples of signal characteristics that can be calculated and used to estimate structural properties of a region of interest. In these examples, the receiver device 30 calculates a linearity index or other value indicative of a degree of nonlinearity of the region, by estimating a difference between two return pulses or echoes, where the pulses are inverted with respect to one another. Inverted return pulses can be generated by, for example, transmitting using inverted chirp excitation or using a wide transmit pulse.

As shown in FIG. 8, the transmitter device 28 can be excited using a wide excitation pulse 70, which results in two inverted pulses A1 and A2. The pulses are time-synchronized using the first rising edge of return pulse A1 and the first falling edge of pulse A2. If the medium (region of interest) producing the internal diffuse backscatter is linear, the two pulses will sum to zero when time synchronized and summed. However, if the medium is non-linear, the pulses will not cancel. Therefore the relative degree of nonlinearity of a rock sample can be detected.

In the example of FIG. 8, a nonlinearity value or index is estimated by calculating the sum of the time-synchronized return pulses A1 and A2. The degree of non-linearity can be estimated by detecting the internal diffuse backscatter from within the rock after exciting the transducer with inverted or half amplitude transmit pulses.

In the example of FIG. 9, a first pulse 72 and a second pulse 74 are transmitted. The second pulse 74 is a half-amplitude replica of the first pulse 72. These pulses produce a first return pulse 76 (first return signal segment) and a second return pulse 78 (second return signal segment), which may be time synchronized. The second return pulse 78 is multiplied by two and summed with the first return pulse 76.

If the region of interest is linear (e.g., a high density rock), the structure of the region responds equally to positive and negative pressures and reflects back with equal but opposite echoes (first and second return signal segments), which will be canceled. Any non-linear target such as low density rock with fluid filled pores, responds with higher order harmonic responses with different phases that add constructively. Accordingly, the sum provides a non-linearity index that can be correlated with features such as density or porosity.

As noted above, the transmitter device 28 can be configured to emit acoustic measurement signals with multiple frequencies. In one embodiment, structural characteristics of a region of interest can be estimated by comparing return signals generated by different frequency acoustic measurement signals. For example, it has been found that 400 kHz to 2 MHz ultrasound propagation in sandstone rock is frequency dependent, and as the value of kd varies around 0.2, the magnitude of internal diffuse backscatter will vary. The entropy of internal diffuse backscattered signals at two frequencies (e.g., 500 and 750 kHz) can be measured as a means to detect physical differences in the rock matrix.

For example, the entropy of return signals associated with a first frequency is compared to the entropy of return signals associated with a second frequency, and the difference is associated with structural features such as density and porosity. Also, because the intervening drilling mud can have a significant influence on the internal diffuse backscattered signal, operating at two frequencies provides a means to correct for this effect.

Embodiments described herein are not limited to use in estimating internal structural features, as the excitation, detection and processing methods described herein can be used for additional purposes. For example, return signal data can be used to detect non-linearity of borehole fluid by gating portions of the return signal that are received before surface reflection pulses. For example, signal data before surface pulses can be gated and analyzed similar to that discussed above to estimate a non-linearity index, which can be associated with fluid characteristics such as the presence of mud cuttings and gas. In another embodiment, similar detection methods can be used to evaluate characteristics (e.g., density, porosity) of cement behind casings.

Figure 10:
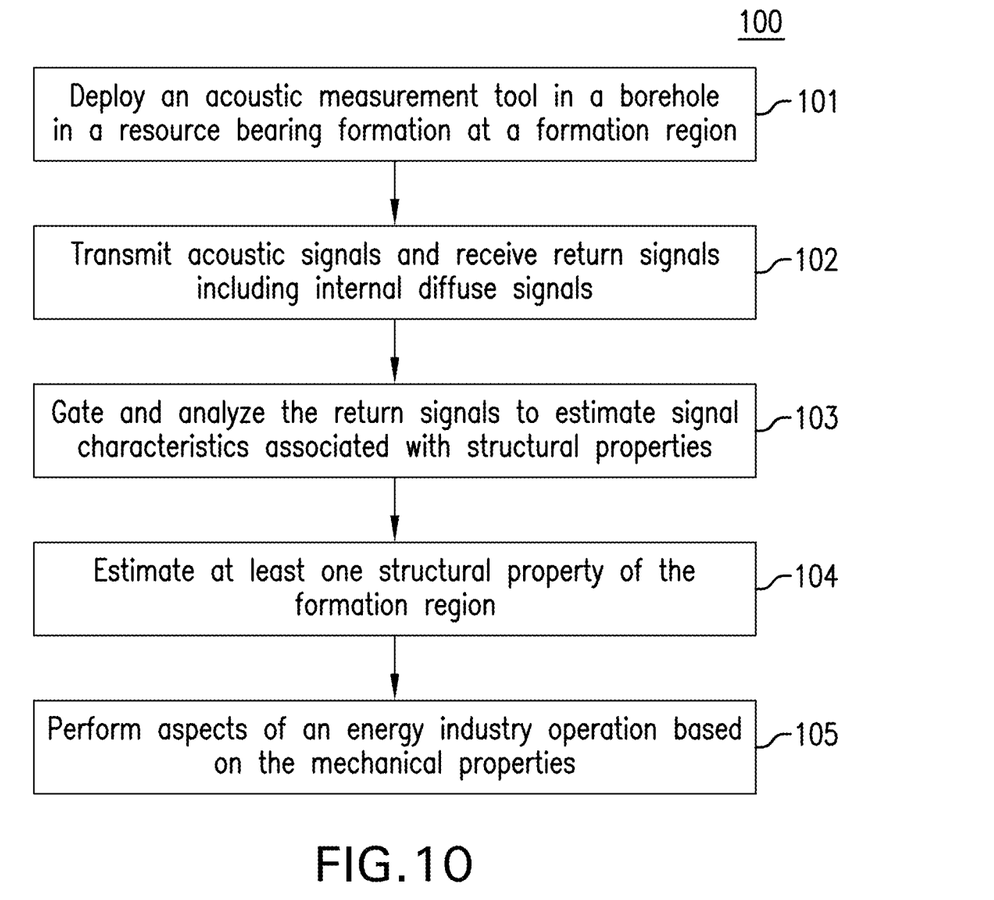
FIG. 10 depicts an embodiment of a method of estimating at least one structural property of a region of interest of an earth formation.

FIG. 10 illustrates a method 100 for estimating structural characteristics of a formation and/or performing aspects of an energy industry operation. The method 100 includes one or more stages 101-105. The method 100 is described herein in conjunction with a processor (e.g., the receiver device 30 and/or the surface control unit 20) that receives signal data, but is not so limited, and can be performed in conjunction with any number of processing devices. In one embodiment, the stages 101-105 are performed in the order described, although some steps may be performed in a different order or one or more steps may be omitted.

In the first stage 101, an imaging tool or logging tool such as the logging tool 16 is disposed in a borehole in an earth formation. The logging tool 16 may include separate transmitter devices 28 and receiver devices 30 (which can be co-located or at different locations along the borehole), or a single transducer device for transmission and detection of acoustic signals.

In one embodiment, the receiver devices 30 are phase insensitive transducers, which detect the total amount of backscattered energy (return signal) without signal degradation due to phase cancelation, and with reduced sensitivity to angle of incidence. In one embodiment, the receiver devices 30 and the transmitter devices 28 are configured as multilevel transducers to eliminate stick-slip and stick-and-pull image artifacts. Such transducers are discussed in more detail in U.S. Pat. No. 9,766,363 B2, dated Sep. 19, 2017, the entire contents of which are hereby incorporated by reference herein.

In the second stage 102, an ultrasonic acoustic measurement signal including a series of time domain pulses are transmitted into a region of interest, e.g., a region of a resource bearing formation or other earth formation. The acoustic measurement signal can be transmitted using one or more transmitters such as one or more transmitter devices 28, or any other suitable phased array or rotating transmitter. The measurement signal includes one or more frequencies selected to penetrate the surface of the borehole and into the internal structure of the region of interest and generate a return signal that includes constituents corresponding to internal diffuse backscatter. In one embodiment, the one or more transmitter devices can utilize coded excitation to increase ultrasound penetration within the rock to enhance the signal-to-noise ratio of the backscatter.

A detector such as a detector in one or more receiver devices 30 detects acoustic return signals.

In the third stage 103, the return signals are processed by gating the return signals to separate or isolate portions of the return signals associated with internal diffuse backscatter. For example, multiple portions of the return signals are gated and compared to estimated signal characteristics such as attenuation, entropy, linearity and frequency difference as discussed above.

Figure 11:
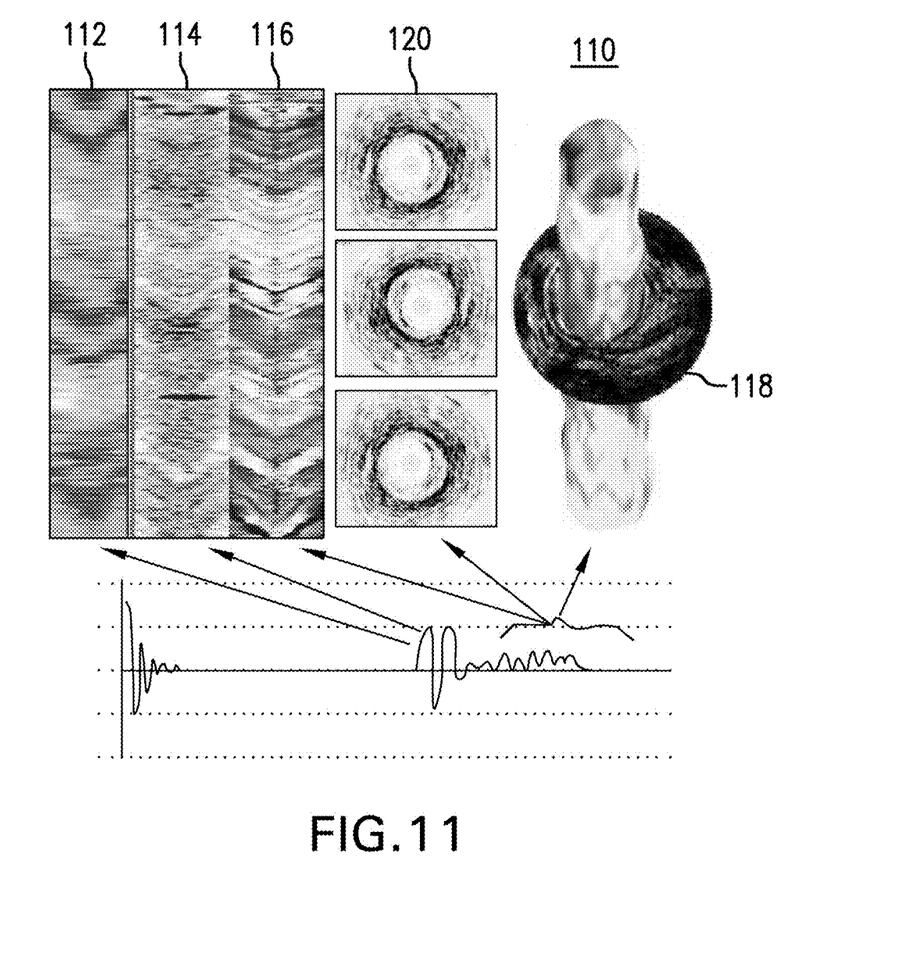
FIG. 11 depicts an example of an image of a region of interest produced using the method of FIG. 10.

In one embodiment, an image log is generated based on the estimated characteristics. An example of an image log 110 is shown in FIG. 11. The image log 110 may include two-dimensional and/or three-dimensional components. For example, the image log 110 includes a first image layer 112 and a second image layer 114 that show surface reflection characteristics as a function of depth (length along a borehole) and angular position. A third image layer 116 shows internal diffuse backscatter characteristics (e.g., attenuation value, linearity index) that can be correlated with structural features.

As also shown in FIG. 11, the image log can be translated to a three-dimensional image 118 that shows features of the borehole surface, the interior of the borehole and the internal structure of the region of interest. Additional images can be generated, such as two dimensional images 120 in planes orthogonal to the borehole axis.

In the fourth stage 104, one or more structural features of the region of interest are estimated based on one or more of the above internal diffuse backscatter signal characteristics. For example, if the signal characteristic and/or image data include values or distributions of attenuation or linearity, such characteristics and/or image data can be correlated with structural features such as rock density, porosity, permeability and brittleness.

In one example, signal characteristics having absolute values can be directly correlated with values of density and porosity, and characteristics having statistical values can be correlated with properties of permeability and brittleness.

In the fifth stage 105, the images and data representing structural properties are used to facilitate and/or control other operations, such as modeling and planning, drilling, stimulation and production. For example, image log data can be displayed to an operator or input to another process or program that changes or controls operational parameters of an energy industry operation based on the image log data.

For example, the images and data can be used to generate or develop mathematical models such as geological models, facies models, structural models, fracturing models, production models, and drilling navigation models. They can also be used in conjunction with other measurement results such as surface and vertical borehole seismic results, active and microseismic interpretation results and reservoir characterization results using other measurement techniques (e.g., resistivity, porosity, gamma ray, density, neutron and other measurements). In addition, the structural data and images can be used to improve interpretation results for technologies such as surface seismic and microseismic measurement techniques.

Other operations that can be improved using the structural data and images include drilling operations, which can be directed based on structural properties, e.g., to target areas of high hydrocarbon concentration. In addition, stimulation planning and operation can be enhanced, e.g., by placing perforation and fracturing locations in hot spots or other areas that may provide higher production using the structural data. For example, an operator or processing device such as the control unit 20 can steer or otherwise control a direction of a drilling assembly, and/or control other parameters such as fluid flow rate and weight on bit, based on estimated structural features. In another example, the control unit 20 or other processing device can select, control or adjust a location or locations at which production components (e.g., sand screens) or stimulation components (e.g., perforating and/or fracturing assemblies) are to be located to maximize or otherwise increase the productive capabilities of a borehole.

The embodiments described herein provide numerous advantages. For example, various features and embodiments described herein are utilized to improve the performance of an acoustic measurement tools in wireline and LWD operations. Existing pulse-echo wireline and LWD ultrasonic open hole imaging instruments investigate the surface of a borehole by capturing the echo from the surface of the borehole wall and recording its amplitude and travel time, but do not evaluate diffuse backscatter from within a formation to investigate the internal microstructure of the rock formation surrounding the borehole.

In addition to providing additional structural information, embodiments described herein can greatly improve spatial resolution of these rock properties than is currently available from existing borehole nuclear and acoustic tools, due to the relatively small ultrasonic spot size and increased depth-of-field capabilities.

Set forth below are some embodiments of the foregoing disclosure:

Embodiment 1: A system for estimating a property of a region of interest, comprising: an acoustic measurement device configured to be disposed in a region of interest in an earth formation, the acoustic measurement device including a transmitter configured to emit an acoustic signal having at least one selected frequency configured to penetrate a surface of a borehole and produce internal diffuse backscatter from earth formation material behind the surface and within the region of interest, and a receiver configured to detect return signals from the region of interest and generate return signal data; and a processing device configured to receive the return signal data, the processing device configured to: process the return signal data to identify internal diffuse backscatter data indicative of the internal diffuse backscatter; calculate one or more characteristics of the internal diffuse backscatter; and estimate a property of the region of interest based on the one or more characteristics of the internal diffuse backscatter.

Embodiment 2: The system as in any prior embodiment, wherein the property is selected from at least one of a density, a porosity, a permeability and a brittleness of earth formation material making up the region of interest.

Embodiment 3: The system as in any prior embodiment, wherein the processing device is configured to identify internal diffuse backscatter data by gating a portion of the return signal data occurring after one or more initial pulses in the return signal data associated with surface reflections.

Embodiment 4: The system as in any prior embodiment, wherein the processing device is configured to gate a first portion of the return signal data and a second portion of the return signal data occurring after the one or more initial pulses.

Embodiment 5: The system as in any prior embodiment, wherein the processing device is configured to calculate a first power spectrum of the first portion and a second power spectrum of the second portion, and calculate an attenuation value based on a difference between the first power spectrum and the second power spectrum, the attenuation value associated with the property.

Embodiment 6: The system as in any prior embodiment, wherein the processing device is configured to calculate a first spectrum of the first portion and a second spectrum of the second portion, estimate a first spectral centroid frequency of the first spectrum and a second spectral centroid frequency of the second spectrum, and calculate a spectral centroid frequency shift based on a difference between the first spectral centroid frequency and the second spectral centroid frequency, the spectral centroid frequency shift associated with the property.

Embodiment 7: The system as in any prior embodiment, wherein the processing device is configured to calculate a probability distribution function of the gated portion of the return signal data, estimate an entropy value based on the probability distribution function, the entropy value associated with the property.

Embodiment 8: The system as in any prior embodiment, wherein the acoustic signal includes at least two pulses configured to be reflected from a structure within the region of interest as at least a first return pulse and a second return pulse, the first return pulse inverted with respect to the second return pulse.

Embodiment 9: The system as in any prior embodiment, wherein the processing device is configured to time synchronize the first return pulse and the second return pulse, and estimate a degree of nonlinearity of the region of interest based on a sum of the amplitudes of the first return pulse and the second return pulse, the degree of nonlinearity associated with the property.

Embodiment 10: The system as in any prior embodiment, wherein the acoustic signal includes a first acoustic signal having a first frequency and a second acoustic signal having a second frequency, and the processing device is configured to estimate a difference between an energy of internal diffuse backscatter of the first acoustic signal and an energy of internal diffuse backscatter of the second acoustic signal.

Embodiment 11: A method of estimating a property of a region of interest, comprising: deploying an acoustic measurement device in a borehole within the region of interest in an earth formation, the acoustic measurement device including a transmitter and a receiver; emitting, by the transmitter, an acoustic signal having at least one selected frequency configured to penetrate a surface of the borehole and produce internal diffuse backscatter from earth formation material behind the surface and within the region of interest; detecting, by the receiver, return signals from the region of interest and generating return signal data; processing the return signal data by a processing device to identify internal diffuse backscatter data indicative of the internal diffuse backscatter; calculating one or more characteristics of the internal diffuse backscatter; estimating a property of the region of interest based on the one or more characteristics of the internal diffuse backscatter; and controlling an operational parameter of an energy industry operation based on the estimated property.

Embodiment 12: The method as in any prior embodiment, wherein the property is selected from at least one of a density, a porosity, a permeability and a brittleness of earth formation material within the region of interest.

Embodiment 13: The method as in any prior embodiment, wherein processing the return signal data includes gating a portion of the return signal data occurring after one or more initial pulses in the return signal data associated with surface reflections.

Embodiment 14: The method as in any prior embodiment, wherein processing the return signal data includes gating a first portion of the return signal data and a second portion of the return signal data occurring after the one or more initial pulses.

Embodiment 15: The method as in any prior embodiment, wherein the one or more characteristics of the internal diffuse backscatter includes an attenuation value, the attenuation value calculated by calculating a first spectrum of the first portion and a second spectrum of the second portion, and calculating the attenuation value based on a difference between the first spectrum and the second spectrum.

Embodiment 16: The method as in any prior embodiment, wherein the one or more characteristics of the internal diffuse backscatter includes an attenuation value, the attenuation value calculated by calculating a first spectrum of the first portion and a second spectrum of the second portion, estimating a first spectral centroid frequency of the first spectrum and a second spectral centroid frequency of the second spectrum, and calculating a spectral centroid frequency shift based on a difference between the first spectral centroid frequency and the second spectral centroid frequency.

Embodiment 17: The method as in any prior embodiment, wherein the one or more characteristics of the internal diffuse backscatter includes an entropy value, the entropy value calculated by calculating a probability distribution function of the gated portion of the return signal data.

Embodiment 18: The method as in any prior embodiment, wherein the acoustic signal includes at least two pulses configured to be reflected from a structure of the region of interest as at least a first return pulse and a second return pulse, the first return pulse inverted with respect to the second return pulse.

Embodiment 19: The method as in any prior embodiment, wherein processing the return signal data includes time synchronizing the first return pulse and the second return pulse, and calculating the one or more characteristics of the internal diffuse backscatter includes estimating a degree of nonlinearity of the region of interest based on a sum of the amplitudes of the first return pulse and the second return pulse.

Embodiment 20: The method as in any prior embodiment, wherein the acoustic signal includes a first acoustic signal having a first frequency and a second acoustic signal having a second frequency, and calculating the one or more characteristics of the internal diffuse backscatter includes estimating a difference between an energy of internal diffuse backscatter of the first acoustic signal and an energy of internal diffuse backscatter of the second acoustic signal.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system for estimating a property of a region of interest, comprising:
an acoustic measurement device configured to be disposed in a region of interest in an earth formation, the acoustic measurement device including a transmitter configured to emit an acoustic signal having at least one selected frequency configured to penetrate a surface of a borehole and produce internal diffuse backscatter from earth formation material behind the surface and within the region of interest, and a receiver configured to detect return signals from the region of interest and generate return signal data; and
a processing device configured to receive the return signal data, the processing device configured to: process the return signal data to identify internal diffuse backscatter data indicative of the internal diffuse backscatter by gating a portion of the return signal data occurring after one or more initial pulses in the return signal data associated with surface reflections; calculate a probability distribution function of the gated portion of the return signal data, and estimate an entropy value based on the probability distribution function; and estimate the property of the region of interest based on the estimated entropy value.

2. The system of claim 1, wherein the property is selected from at least one of a density, a porosity, a permeability and a brittleness of the earth formation material within the region of interest.

3. The system of claim 1, wherein the processing device is configured to gate a first portion of the return signal data and a second portion of the return signal data occurring after the one or more initial pulses.

4. The system of claim 3, wherein the processing device is configured to calculate a first spectrum of the first portion and a second spectrum of the second portion, estimate a first spectral centroid frequency of the first spectrum and a second spectral centroid frequency of the second spectrum, and calculate a spectral centroid frequency shift based on a difference between the first spectral centroid frequency and the second spectral centroid frequency, the spectral centroid frequency shift associated with the property.

5. The system of claim 1, wherein the acoustic signal includes a first acoustic signal having a first frequency and a second acoustic signal having a second frequency, and the processing device is configured to estimate a difference between an energy of internal diffuse backscatter of the first acoustic signal and an energy of internal diffuse backscatter of the second acoustic signal.

6. A method of estimating a property of a region of interest, comprising:
deploying an acoustic measurement device in a borehole within the region of interest in an earth formation, the acoustic measurement device including a transmitter and a receiver; emitting, by the transmitter, an acoustic signal having at least one selected frequency configured to penetrate a surface of the borehole and produce internal diffuse backscatter from earth formation material behind the surface and within the region of interest;
detecting, by the receiver, return signals from the region of interest and generating return signal data;
processing the return signal data by a processing device to identify internal diffuse backscatter data indicative of the internal diffuse backscatter by gating a portion of the return signal data occurring after one or more initial pulses in the return signal data associated with surface reflections;
calculating a probability distribution function of the gated portion of the return signal data, and estimating an entropy value based on the probability distribution function;
estimating the property of the region of interest based on the estimated entropy value; and
controlling an operational parameter of an energy industry operation based on the estimated property.

7. The method of claim 6, wherein the property is selected from at least one of a density, a porosity, a permeability and a brittleness of earth formation material within the region of interest.

8. The method of claim 6, wherein the acoustic signal includes a first acoustic signal having a first frequency and a second acoustic signal having a second frequency, and estimating the property of the region of interest includes estimating a difference between an energy of internal diffuse backscatter of the first acoustic signal and an energy of internal diffuse backscatter of the second acoustic signal.

9. A method of estimating a property of a region of interest, comprising:
deploying an acoustic measurement device in a borehole within the region of interest in an earth formation, the acoustic measurement device including a transmitter and a receiver;
emitting, by the transmitter, an acoustic signal having at least one selected frequency configured to penetrate a surface of the borehole and produce internal diffuse backscatter from earth formation material behind the surface and within the region of interest;
detecting, by the receiver, return signals from the region of interest and generating return signal data;
processing the return signal data by a processing device to identify internal diffuse backscatter data indicative of the internal diffuse backscatter by gating a portion of the return signal data occurring after one or more initial pulses in the return signal data associated with surface reflections, the portion including a first portion of the return signal data and a second portion of the return signal data occurring after the one or more initial pulses;
calculating a first spectrum of the first portion of the return signal data and a second spectrum of the second portion of the return signal data, estimating a first spectral centroid frequency of the first spectrum and a second spectral centroid frequency of the second spectrum, and calculating a spectral centroid frequency shift based on a difference between the first spectral centroid frequency and the second spectral centroid frequency;
estimating the property of the region of interest based on the calculated spectral centroid frequency shift; and
controlling an operational parameter of an energy industry operation based on the estimated property.

10. The method of claim 9, wherein the property is selected from at least one of a density, a porosity, a permeability and a brittleness of earth formation material within the region of interest.

11. A method of estimating a property of a region of interest, comprising:
deploying an acoustic measurement device in a borehole within the region of interest in an earth formation, the acoustic measurement device including a transmitter and a receiver;
emitting, by the transmitter, an acoustic signal having at least one selected frequency configured to penetrate a surface of the borehole and produce internal diffuse backscatter from earth formation material behind the surface and within the region of interest;

detecting, by the receiver, return signals from the region of interest and generating return signal data;

processing the return signal data by a processing device to identify internal diffuse backscatter data indicative of the internal diffuse backscatter, and calculating one or more characteristics of the internal diffuse backscatter;

estimating the property of the region of interest based on the one or more characteristics of the internal diffuse backscatter; and controlling an operational parameter of an energy industry operation based on the estimated property, wherein the acoustic signal includes at least two pulses configured to be reflected from a structure of the region of interest as at least a first return pulse and a second return pulse, the first return pulse inverted with respect to the second return pulse, and processing the return signal data includes time synchronizing the first return pulse and the second return pulse, and calculating the one or more characteristics of the internal diffuse backscatter includes estimating a degree of nonlinearity of the region of interest based on a sum of the amplitudes of the first return pulse and the second return pulse.

12. The method of claim 11, wherein the property is selected from at least one of a density, a porosity, a permeability and a brittleness of earth formation material within the region of interest.

* * * * *